(12) United States Patent
Peeters

(10) Patent No.: US 7,184,471 B2
(45) Date of Patent: Feb. 27, 2007

(54) METHOD AND APPARATUS FOR TRANSMISSION LINE EQUALIZATION

(75) Inventor: Miguel Peeters, Brussels (BE)

(73) Assignee: Broadcom Corporation, Irvine, CA (US)

( * ) Notice: Subject to any disclaimer, the term of this patent is extended or adjusted under 35 U.S.C. 154(b) by 739 days.

(21) Appl. No.: 10/073,154

(22) Filed: Feb. 13, 2002

(65) Prior Publication Data

US 2003/0067972 A1  Apr. 10, 2003

Related U.S. Application Data

(60) Provisional application No. 60/327,608, filed on Oct. 9, 2001, provisional application No. 60/327,308, filed on Oct. 9, 2001.

(51) Int. Cl.
*H03H 7/30* (2006.01)
(52) U.S. Cl. .................................. 375/229
(58) Field of Classification Search ............... 375/220, 375/222, 229, 232
See application file for complete search history.

(56) References Cited

U.S. PATENT DOCUMENTS

| 5,870,432 | A | 2/1999 | Kerckhove |
| 6,088,386 | A | 7/2000 | Spruyt et al. |
| 6,456,654 | B1 * | 9/2002 | Ginesi et al. ............... 375/229 |
| 6,535,552 | B1 * | 3/2003 | Pessoa ....................... 375/231 |
| 6,819,716 | B1 * | 11/2004 | Purkovic et al. ......... 375/240.26 |
| 6,834,079 | B1 * | 12/2004 | Strait et al. ................. 375/232 |

FOREIGN PATENT DOCUMENTS

WO  WO 99/52250 A1  10/1999

OTHER PUBLICATIONS

Naofal Al-Dhahir et al., "Effeciently Computed Reduced-Parameter Input-Aided MMSE Equalizers for ML Detection: A Unified Approach", IEEE Transactions on Information Theory, vol. 42, No. 3, May 1996.
ITU-T Recommendation G. 992., "Asymmetric Digital Subscriber Line (ADSL) Transceivers", International Telecommunication Union (ITU) Jun. 1999.
European Search Report for European Application No. 02257005.5 dated Jul. 14, 2006, 4 pages.
Sträußnigg, Dietmar et al., "New Approach to Time-domain Equalization and Frequency-domain Transient Compensation for a DMT-based ADSL System," Eurocon'2001, IEEE International Conference on Trends in Communications, vol. 1, Jul. 4, 2001, pp. 11-17.
Horwitz, Paul et al., "The Art of Electronics," pp. 655-657, Section 9.33 Feedback Shift Register Sequences and pp. 664-665, Section 9.38 Digital Filters, Cambridge University Press 1980, 1989, Cambridge, United Kingdom.

* cited by examiner

*Primary Examiner*—Kevin Kim
(74) *Attorney, Agent, or Firm*—Sterne, Kessler, Goldstein & Fox, P.L.L.C.

(57) ABSTRACT

A modem receiver 10 receives a multitone signal with a cyclic extension of M samples on a channel 20. The receiver includes a time domain equalizer 14 that includes a finite impulse response (FIR) filter. The FIR filter targets the combined response of the channel and filter to a target impulse response having N taps, where N is less than M+1.

19 Claims, 5 Drawing Sheets

METHOD AND APPARATUS FOR TRANSMISSION LINE EQUALIZATION

This application claims the benefit of U.S. Provisional Application No. 60/327,308 filed 9 Oct. 2001.

FIELD OF THE INVENTION

The invention relates to a method and apparatus for transmission line equalization, and in particular to a method and apparatus for compensating for the impulse response length of transmission lines.

BACKGROUND OF THE INVENTION

Discrete multi-tone transmission (DMT) may be used to transmit data through a link. For example, DMT transmission is used in asymmetric digital subscriber line (ADSL) systems, where its use is specified by the G.992 standard published by the International Telecommunications Union (ITU).

In the transmission system specified by this standard, a number of input bits are divided between a plurality of discrete "tones", i.e. frequencies. Depending on the exact properties of the link between the transmitter and the receiver, and various constraints, in particular as to output power, some tones are capable of transmitting a larger number of bits than other tones. Accordingly, some of the tones are generally allocated more bits than other tones. A symbol is formed containing a stream of samples calculated by an inverse discrete Fourier transform of constellation points representing the bits of data on each tone. The stream of samples is then transmitted through a channel to a receiver. A sequence of symbols is transmitted sequentially to transmit a data stream.

A difficulty exists in that the channel normally has an impulse response that is not negligible. Thus, when several symbols are transmitted sequentially down the channel interference between the symbols may occur.

The effect of the channel can be considered to be a finite impulse response filter with L taps.

One way of dealing with the effects of the channel is to provide additional samples, known as a cyclic extension, at the beginning of each symbol. The last M samples of each symbol are appended in front of the symbol. This approach can require very long cyclic extensions and thus a prohibitive loss of efficiency.

To address this difficulty, a filter may be provided on the input of the receiver to reduce the effects of intersymbol interference in the channel. Such approaches are disclosed in U.S. Pat. No. 5,870,432, and the paper by N. Al-Dhahir and J. M. Cioffi "Efficiently Computed Reduced-Parameter Input-Aided MMSE Equalizers for ML Detection: A unified Approach", IEEE Transactions on Information Theory, vol. 42, No. 3, May 1996. Both of these documents are incorporated herein by reference in their entirety.

In this approach, a Finite Impulse Response (FIR) filter, called Transversal Equalizer (TEQ), may be inserted at the input of the receiver to correct for the impulse response of the channel and output a signal having reduced cyclic prefix length compared with that of the channel. The algorithm computes the TEQ and finds the FIR coefficients such that the convolution of the Channel Impulse Response (CIR) with the TEQ, called CIReq matches in some sense a Target Impulse Response (TIR) with a length of M+1 taps, where M is the number of samples of the cyclic prefix. As presented in the prior art, the principle of this algorithm is to fix the length of the cyclic prefix and then to shorten the CIR to M+1 taps using the TEQ. As the CIR equation is often in fact longer than M+1 samples, there is a residual error causing intersymbol and intercarrier interference (ISI/ICI) between DMT symbols and thus limiting the data rate over the channel.

A method for frequency interpolation of a DMT system is presented in U.S. Pat. No. 6,088,386 entitled "Transmitter with phase rotor, modulator and demodulator, communication system and method performed thereby", assigned to Alcatel. The contents of this patent are hereby incorporated in their entirety by reference. When a pair of modems are connected together their internal clocks will in general have slightly different frequencies, and accordingly the transmitted and received symbols will not be aligned. The method described in this Alcatel patent aligns the data symbols transmitted from one of the pair of modems with the symbols transmitted from the other. The method achieves the alignment by including in a modem bit addition and deletion means which add and delete transmitted bits as required. The modem also includes a phase rotation means to rotate the phase of received symbols, to counteract the effect of small differences in the timing of the clocks of the two modems corresponding to less than the time taken to transmit a single bit.

The patent describes the activation of bit addition and deletion means in both the transmitting and receiving paths of one of the two communicating modems, to align the symbols transmitted by both modems. Any corresponding equipment that may be present in the other of the two modems is deactivated.

However, the addition or removal of bits causes symbol timing jitter. This causes a variation in the interference structure that can be very large and abrupt which leads to spurious errors on the transmission link.

SUMMARY OF INVENTION

According to the invention there is provided a modem for receiving a multitone signal having a plurality of symbols with a cyclic extension of length M samples transmitted through a channel. The modem includes a transversal equalizer connected to the signal input. The transversal equalizer includes a Finite Impulse Response filter having coefficients such that the combined impulse response of the channel and the transversal equaliser targets a target impulse response having N taps, where N and M are integers and N<(M+1).

The difference between the impulse response of the channel together with the transversal equaliser and the target impulse response may in particular be minimised.

By reducing the number of taps of the Target Impulse Response embodiments of the invention may provide a surprising reduction in spurious errors.

Conveniently, N=M.

Conventional systems, such as disclosed in the prior art, use a target impulse response of M+1 taps. In the invention the target impulse response having N samples may be internally represented by a data set having M+1 data elements, at least the first or last of the M+1 data elements being set to zero. This reduces the modification of existing hardware and software required.

The modem may have a means for lengthening or shortening a DMT symbol for frequency domain interpolation. The use of a target impulse response having fewer taps than conventionally may substantially reduce the jitter effect caused by lengthening or shortening the DMT symbol.

The modem may include calculating means for calculating the coefficients of the Finite Impulse Response filter to minimise an error function of the difference between the convolution of the channel with the transversal equaliser and a target impulse response having N taps.

In addition to the receiving components discussed above, the modem may further include a transmitter, which in embodiments may further include a phase rotation means and a module for adding or removing bits from symbols.

The invention also relates to a system including such a modem, a method for equalising a multitone signal and a computer program recorded on a data carrier for cooperating with a computer system having a processor and a memory to carry out the steps of the method.

BRIEF DESCRIPTION OF DRAWINGS

Specific embodiments of the invention will now be described, purely by way of example, with reference to the accompanying drawings, in which.

DETAILED DESCRIPTION

Figure 1:
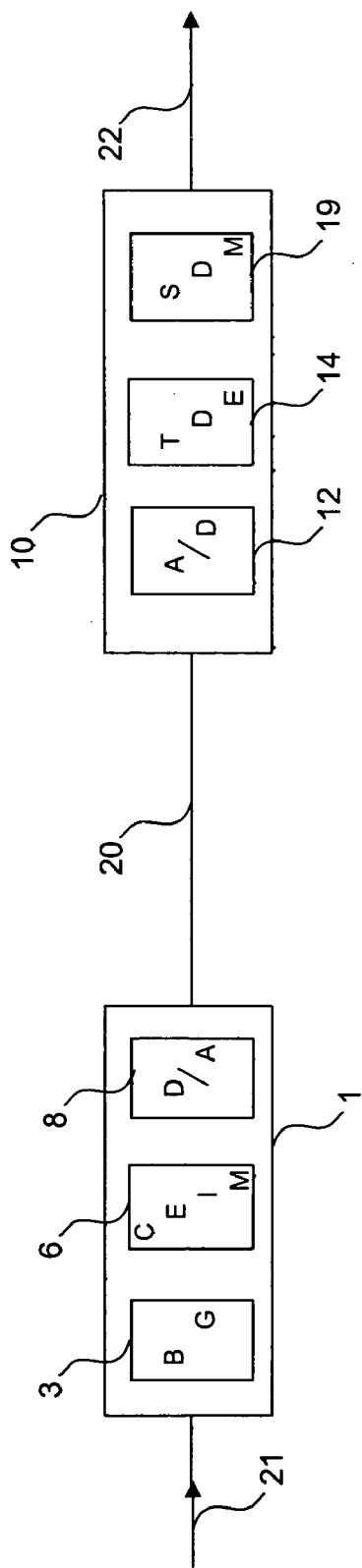
FIG. 1 is a schematic drawing of a first embodiment of the invention.

Referring to FIG. 1, a modem 1 includes a symbol bitstream generator 3 for generating a bit stream including a plurality of symbols at discrete multiple tones, a cyclic extension insertion module 6 and a digital to analog (D/A) converter 8. A receiver 10 includes an analog to digital (A/D) converter 12, a time domain equalizer 14 and a symbol decode module 19. The symbol bitstream generator 4, the cyclic extension insertion module 6, the D/A converter 8, the A/D converter 12 and the symbol decode module 19 are known in the art and will not be described further. The time delay equalizer 14 is a Finite Impulse Response transversal equalizer, explained in more detail below.

The modem 1 and receiver 10 are connected by channel 20.

In use, an input bitstream 21 is converted into discrete multitone symbols, transmitted through channel 20 by modem 1 and regenerated in receiver 10.

Figure 2:
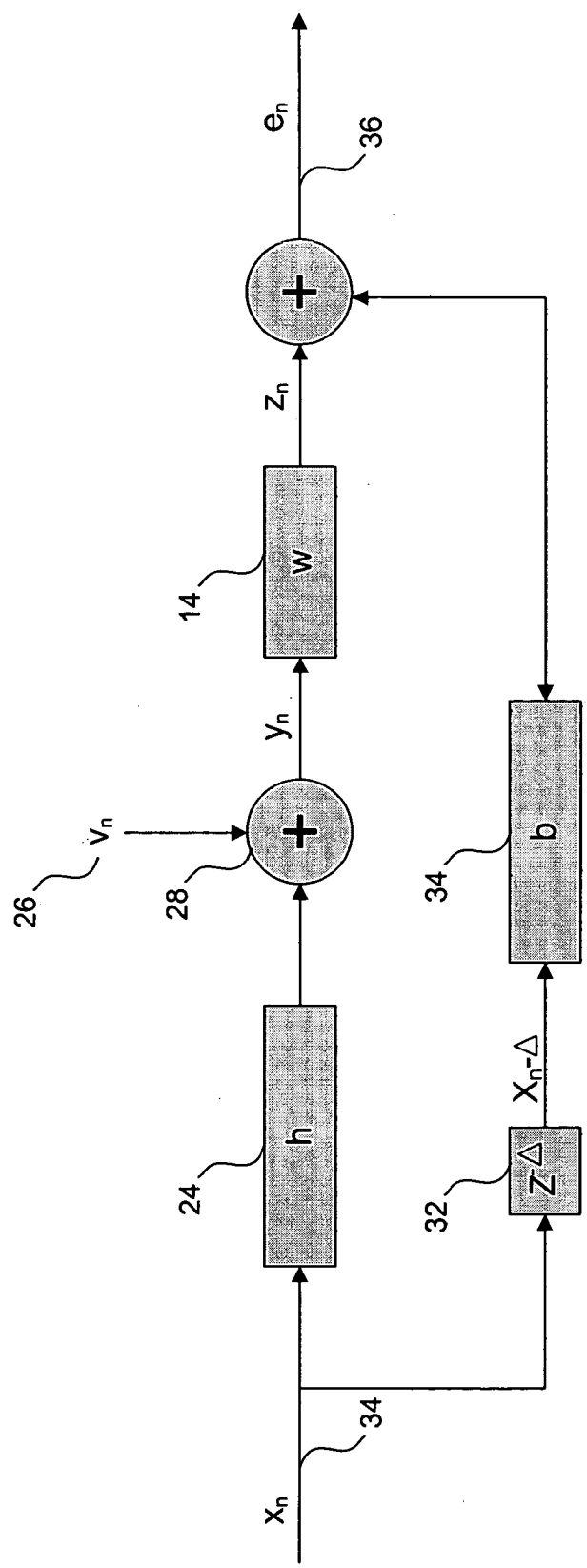
FIG. 2 is a schematic drawing of a model of the arrangement according to the invention.

The arrangement of FIG. 1 can be modelled as in FIG. 2. The effect of the channel 20 is modelled as a Finite Impulse Response filter 24 having L taps together with a noise source 26 summed in summer 28. The time domain equalizer 14 is included in the model.

The receiver 10 acts to target the combined effect of channel 20 and time domain equaliser 14 to match a delay 32 followed by a Target Impulse Response (TIR) 34. The target impulse response 34 is a Finite Impulse Response (FIR) filter having N taps.

Consider the case that the cyclic extension insertion module inserts M bits into each symbol. In embodiments, the last M bits of each symbol are appended at the beginning of the symbol.

A Discrete MultiTone (DMT) Signal transmitted over a digital channel with a response determined with L taps might be perfectly equalized by appending to the DMT signal a cyclic prefix made of M=L−1 samples consisting of a copy of the last L−1 samples of the DMT signal. However a channel is often very long so L is large and the use of this simple technique would lead to a prohibitive loss in efficiency.

Figure 3:
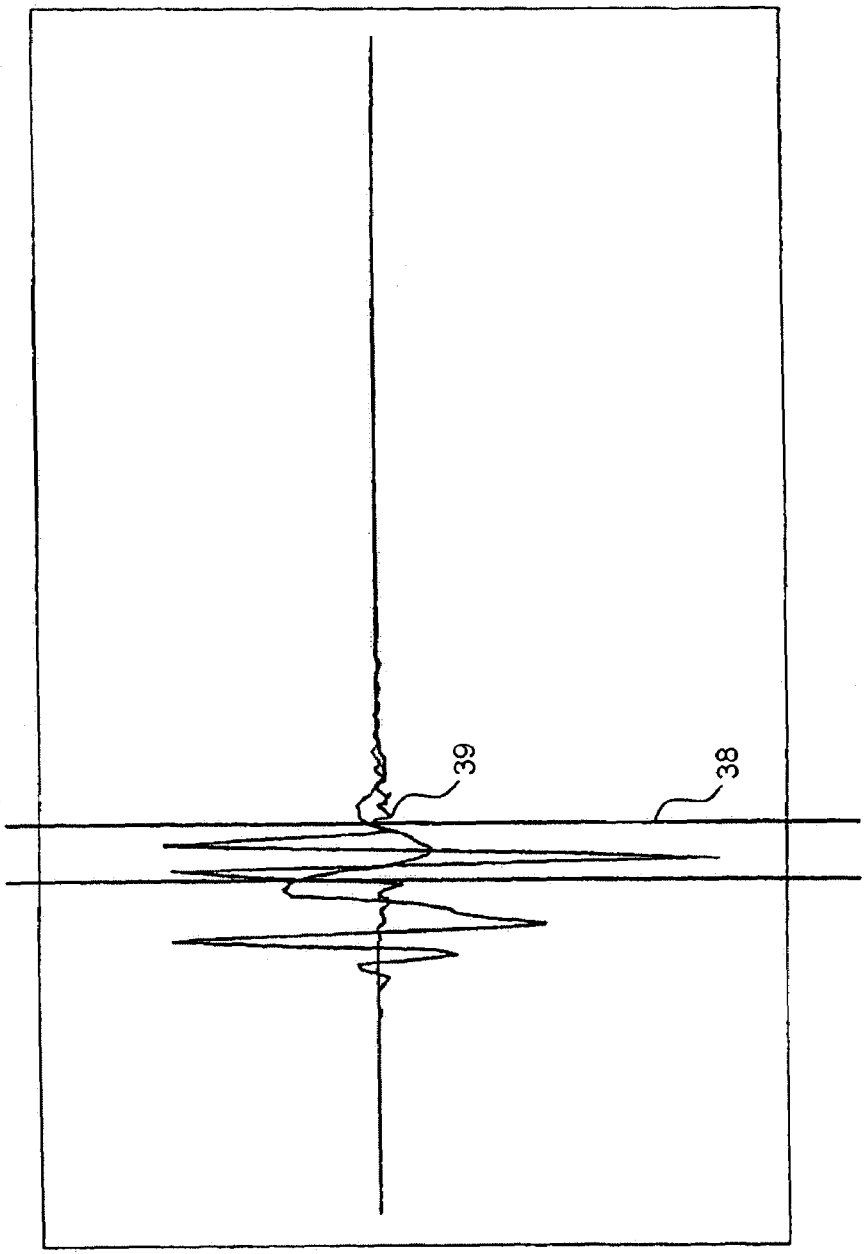
FIG. 3 is an illustration of the signal before and after equalisation.

Accordingly, instead the time domain equaliser 14 is used to operate on the signal output from the channel 20 so that the combined effect of channel 20 and time domain equaliser 14 is approximately the Target Impulse Response 34. The Target impulse response is chosen to have N taps, where N<L. In this way, fewer cyclic extension bits are required than in the case that the time domain equaliser 14 is not used. FIG. 3 illustrates the signal before (curve 38) and after (curve 39) equalisation. The improvement caused by the equaliser is apparent.

In the invention a TIR 34 having fewer than M+1 samples is used (as explained above, M is the number of cyclic extension bits). Alternatively, a TIR having a data representation with M taps is used, but at least the first tap or the last tap is set equal to 0. Both choices are mathematically equivalent.

The error signal 36 is the difference between the model of the channel 24, including noise 26, and channel and time domain equaliser 14, and the model of the delay 32 and TIR 34. The time domain equaliser (transversal equaliser) 14 is adapted to minimise the error signal 3. A suitable algorithm for adapting the time domain equaliser to achieve a target impulse response is discussed in U.S. Pat. No. 5,870,432 which is incorporated herein by reference.

Experiments show that variation of the interchannel interference/intersymbol interference structure due to symbol timing jitter at the transmitter can be significantly reduced. Symbol timing jitter at the transmitter causes variation in the interference structure that can be very large and abrupt leading to spurious errors on the transmission link.

Figure 4:
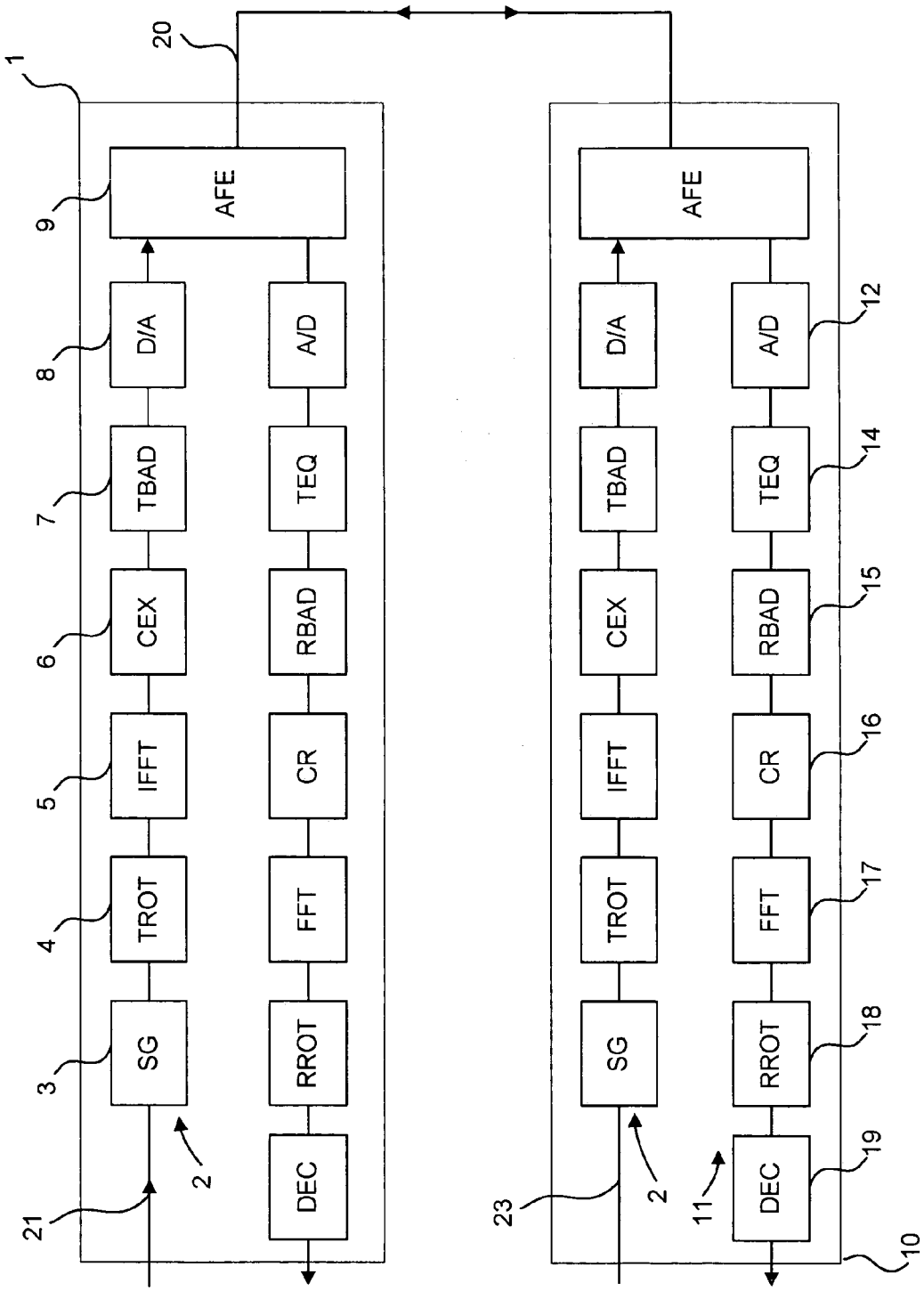
FIG. 4 is a schematic drawing of a second embodiment of the invention.

The invention is of particular application to a modem having the capability to add and remove bits of symbols in order to align transmitted and received symbols, for example to ease echo cancellation. A modem of this type is illustrated in FIG. 4.

A modem 1 includes a transmission side 2 including symbol generator 3 generating a bit stream including a plurality of symbols at discrete multiple tones. The individual components of the symbol generator are known and will not be described further. A transmission phase rotation circuit 4 adjusts the phase of the symbols for aligning transmitted and received symbols, and feeds into an inverse fast Fourier transform module 5 which generates the symbols having discrete multiple tones. A cyclic extension insertion module 6 adds cyclic prefixes and feeds into a transmission bit addition and deletion circuit 7 for adding or deleting a bit of a symbol. A digital to analog (D/A) converter 8 which feeds into an analogue front end 9.

On the receiving side 11 the analogue front end 9 feeds into an analog to digital (A/D) converter 12, a time domain equalizer 14 and a receiving side bit addition and deletion circuit 15. Cyclic prefix removal module 16 removes the cyclic prefixes and feeds into fast Fourier transform module 17, receiving side phase rotation circuit 18 and a symbol decode module 19. Many of these components are known in the art and will not be describe further. The time delay equalizer 14 is a Finite Impulse Response transversal equalizer, explained in more detail below.

It will be appreciated by the skilled person that the modem may include additional components, for example a serial to parallel module for transmitting a data stream on a plurality of carrier frequencies or a module for combining a plurality of input datastreams for transmission.

In use, the modem 1 may be connected to a like further modem 10 through channel 20.

A first bitstream 21 is converted into discrete multitone symbols, transmitted through channel 20 by modem 1 and regenerated in further modem 10. A reverse bitstream 23 passes in the opposite direction.

The transmission phase rotator 4 and receiving phase rotator 18 in one of the two modems 1,10 is controlled to compensate for slight misalignment of the symbols of the two bitstreams 21,23 with one another. As time goes on, any misalignment in the clock frequencies of the two modems 1,10 will tend to cause drift of the phase, and so the phase rotator will slowly need to modify the phase rotation. When the required phase rotation becomes too large, for example more than half the time for the transmission of a bit, a bit may be added or deleted in the transmission bit addition and deletion module 7 to reduce the phase rotation and to accurately align the transmitted and received symbols. However, this addition or deletion of bits causes jitter.

Figure 5:
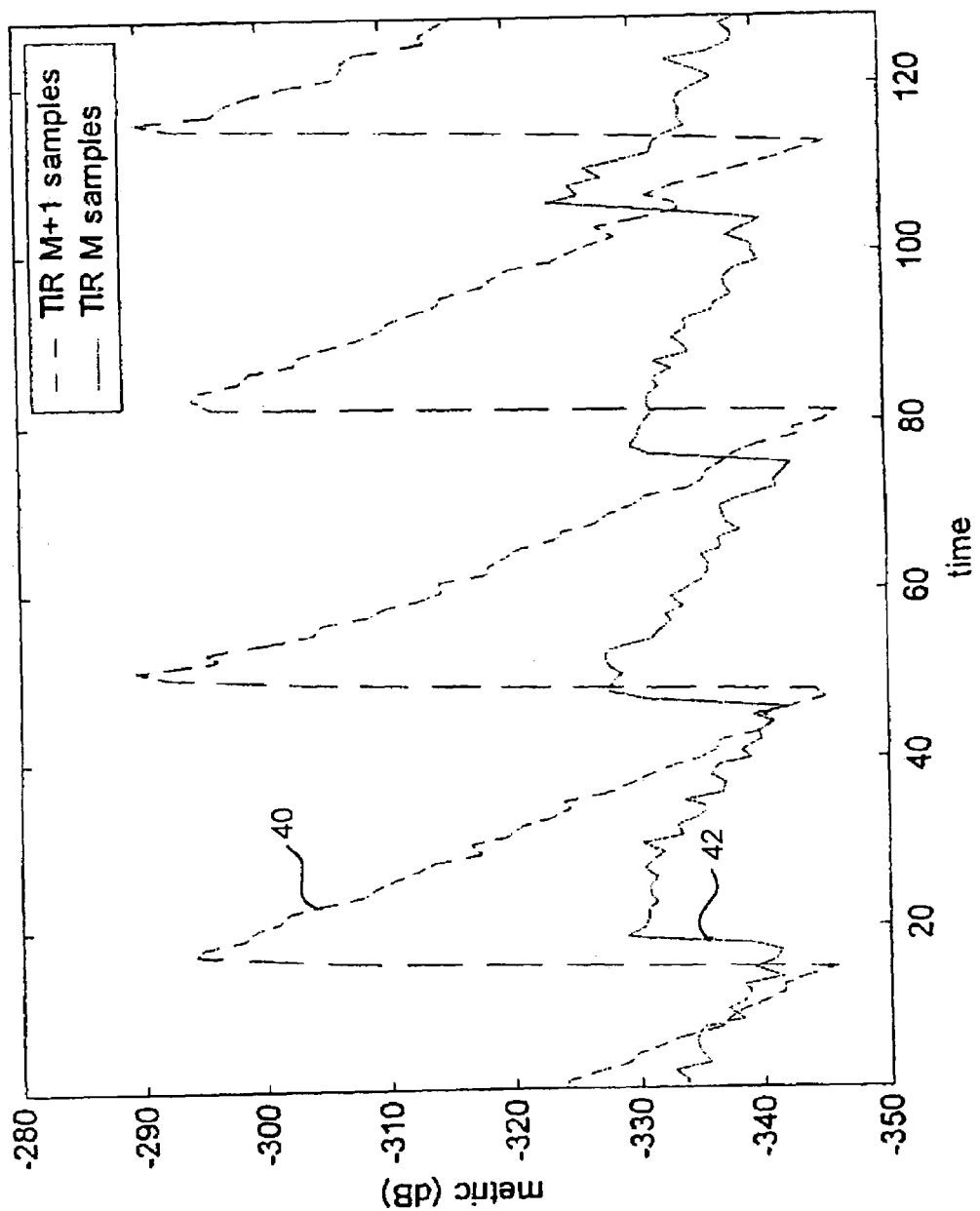
FIG. 5 is an illustration of the results achieved with and without the invention.

By ensuring that the transversal equalizer 14 uses a target impulse response of fewer than M+1 taps, jitter that might otherwise cause inter-symbol interference or noise can be substantially reduced. FIG. 5 depicts the variation of a metric in function of time with a TIR of M+1 samples (curve 40). The metric is equal to the sum of the logarithm of the noise on all the tones. The same figure depicts (curve 42) the metric with a TIR of M samples. The effect of the technique is tremendous as the variation is reduced by around 40 dB. Experiments show that this is sufficient to remove spurious errors.

The invention is described above with respect to an ADSL modem using DMT transmission. However, the invention may also be used with other modulation approaches including discrete wavelet multi tone modulation.

Although the terms "transmitter" and "receiver" are used, in practice apparatus may be provided with both transmission and reception capability if required.

It will be appreciated that the above described embodiments is simply presented by way of example and that the skilled person will be able to provide alternative implementations. Notice is hereby given that claims may be formulated to any feature or novel combination of features herein. Further, notice is given that the use of singular terms such as "a" is not intended to exclude the plural.

I claim:

1. A modem for receiving a multitone signal having a plurality of symbols with a cyclic extension of length M samples transmitted through a channel, comprising:
    a signal input for receiving the multitone signal; and
    a transversal equalizer coupled to the signal input and including a finite impulse response filter having coefficients such that a combined impulse response of the channel and the transversal equalizer targets a target impulse response having N taps, where N and M are integers and N<(M+1);
    wherein the target impulse response is represented by a data set having M+1 data elements, wherein at least a first or a last of the M+1 data elements is set to zero.

2. The modem according to claim 1, wherein the modem further comprises a bit adjustment means for lengthening or shortening a symbol for use in frequency domain interpolation.

3. The modem according to claim 1, wherein N=M.

4. The modem according to claim 1, including a means for calculating the coefficients of the finite impulse response filter to minimize an error function of a difference between a convolution of the channel with the transversal equalizer and a target impulse response having N taps.

5. The modem according to claim 1, wherein a difference between the combined impulse response of the channel and the transversal equalizer and the target impulse response is minimized.

6. A method for equalizing a multitone signal formed of a stream of multitone symbols having an extension of length M samples passing through a channel with a finite impulse response filter having filter coefficients, including:
    receiving the multitone signal from the channel;
    passing the multitone signal through the finite impulse response filter;
    delaying the multitone signal;
    adjusting the filter coefficients so that a combined effect of the channel and the finite impulse response filter on the multitone signal targets a target impulse response having N samples of the delayed multitone signal, wherein N and M are integers and N<(M+1);
    wherein the target impulse response is represented by a data set having M+1 data elements; and
    setting at least a first or a last of the M+1 data elements to zero.

7. The method according to claim 6, further including adding or deleting bits to keep a phase rotation within predetermined limits.

8. The method according to claim 6, wherein N=M.

9. The method according to claim 6, further including calculating the coefficients of the finite impulse response filter to minimize an error function of a difference between a convolution of the channel with a transversal equalizer and a target impulse response having N taps.

10. The method according to claim 6, further including minimizing a difference between
    the combined impulse response of the channel and a transversal equalizer; and
    the target impulse response.

11. A computer program recorded on a data carrier for cooperating with a computer system having a processor and a memory including code to cause the processor to carry out the steps of:
    receiving a multitone signal having an extension of length M samples from a channel;
    passing the multitone signal through a finite impulse response filter having filter coefficients;
    delaying the multitone signal;
    adjusting the filter coefficients so that the combined effect of the channel and the finite impulse response filter on the multitone signal targets a target impulse response having N samples of the delayed multitone signal, wherein N and M are integers and N<(M+1 );
    wherein the target impulse response is represented by a data set having M+1 data elements; and
    setting at least a first or a last of the M+1 data elements to zero.

12. The computer program according to claim 11, further including code for frequency modulating the multitone signal.

13. The computer program according to claim 11, wherein N=M.

14. A system, comprising:
    a first modem including
        a cyclic extension addition module for adding M extension samples to a discrete multitone (DMT) symbol; and a digital-to-analog converter for transmitting the DMT symbol and the M extension samples into a channel; and a second modem including a signal input connected to the channel; and a transversal equalizer coupled to the signal input, the transversal equalizer including a finite impulse response filter having coefficients such that a combined impulse response of the channel and the transversal equalizer targets a target impulse response having N taps, where N and M are integers and $N<(M+1)$;

wherein the target impulse response is represented by a data set having M+1 data elements, wherein at least a first or a last of the M+1 data elements is set to zero.

15. The system according to claim 14, wherein the first modem includes a frequency phase rotation means and a means for at least one of bit addition and deletion to adjust a phase of the DMT symbol and the M extension samples.

16. The system according to claim 14, wherein the second modem further includes a second cyclic extension addition module and a second digital-to-analog converter; and the first modem further includes a second signal input and a second transversal equalizer.

17. A method of modem communication, including:

transmitting a multitone signal having a phase from a first modem to a second modem through a channel, the multitone signal formed of plurality of symbols and having an extension of length M samples;

rotating the phase of multitone signal to align the plurality of symbols;

receiving the multitone signal from the channel;

passing the multitone signal through a finite impulse response filter having filter coefficients;

delaying the multitone signal;

adjusting the filter coefficients so that the combined effect of the channel and the finite impulse response filter on the multitone signal targets a target impulse response having N samples of the delayed multitone signal, wherein N and M are integers and $N<(M+1)$;

wherein the target impulse response is represented by a data set having M+1 data elements; and setting at least a first or a last of the M+1 data elements to zero.

18. The method of claim 17, further including adding a bit to the multitone signal to align the plurality of symbols of the multitone signal.

19. The method of claim 17, further including deleting a bit from the multitone signal to align the plurality of symbols of the multitone signal.

* * * * *